United States Patent
Shiraishi et al.

(10) Patent No.: US 7,043,026 B1
(45) Date of Patent: May 9, 2006

(54) METHOD FOR REMOVING AM NEIGHBORING INTERFERENCE AND A CIRCUIT FOR THE SAME

(75) Inventors: Kenichi Shiraishi, Yokohama (JP); Atsushi Shinoda, Sagamihara (JP)

(73) Assignee: Kabushiki Kaisha Kenwood, Tokyo (JP)

( * ) Notice: Subject to any disclaimer, the term of this patent is extended or adjusted under 35 U.S.C. 154(b) by 0 days.

(21) Appl. No.: 09/247,826

(22) Filed: Feb. 11, 1999

(30) Foreign Application Priority Data

Mar. 13, 1998 (JP) .............................. 10-080580

(51) Int. Cl.
*H04H 5/00* (2006.01)
*H04B 1/10* (2006.01)

(52) U.S. Cl. .................... 381/13; 381/15; 455/306; 455/296

(58) Field of Classification Search ............... 455/296, 455/303, 306, 266, 254, 206, 305, 311, 313, 455/146, 147, 209, 212, 213, 258; 381/2, 381/4, 6, 14, 15, 16, 13; 375/268, 270, 300, 375/301, 320, 321
See application file for complete search history.

(56) References Cited

U.S. PATENT DOCUMENTS

| | | | | | |
|---|---|---|---|---|---|
| 3,628,155 | A | * | 12/1971 | Muzzi ........................ | 455/306 |
| 4,181,892 | A | * | 1/1980 | Dilley ........................ | 455/306 |
| 4,864,643 | A | * | 9/1989 | French et al. ............... | 455/302 |
| 4,992,747 | A | * | 2/1991 | Myers ........................ | 329/316 |
| 5,134,723 | A | * | 7/1992 | Carson ........................ | 455/254 |
| 5,603,110 | A | * | 2/1997 | Heinzmann .................. | 455/203 |
| 5,909,644 | A | * | 6/1999 | Tomiyama ................... | 455/146 |
| 6,813,310 | B1 | * | 11/2004 | Okanobu ..................... | 375/216 |

FOREIGN PATENT DOCUMENTS

| | | |
|---|---|---|
| JP | 53-002020 | 1/1978 |
| JP | 53002020 A * | 1/1978 |

* cited by examiner

*Primary Examiner*—Xu Mei
(74) *Attorney, Agent, or Firm*—Eric J. Robinson; Robinson Intellectual Property Law Office, P.C.

(57) ABSTRACT

An AM neighboring interference removing method and circuit is provided which can select only a desired AM modulation wave even if an interference AM modulation wave is partially superposed upon the desired AM modulation wave. An AM modulation wave desired to be received is multiplied at multipliers by local oscillation signals having frequencies $3fc/2$ and $fc/2$ where fc is the carrier frequency of a neighboring interference AM modulation wave. High frequency components contained in the outputs of the multipliers are removed by low-pass filters. Of the outputs of the low-pass filters, the carrier frequency of the neighboring interference wave is $fc/2$ and the AM carrier frequencies of the AM stereo modulation wave are $(fc/2+f\alpha)$ and $(fc/2-f\alpha)$, where $f\alpha$ is a difference frequency between the AM carrier frequency of the AM stereo modulation wave and the carrier frequency of the neighboring interference wave. A subtractor subtracts the output of one of the low-pass filter from the output of the other to thereby cancel out the neighboring interference wave. This subtraction signal is passed through a low-pass filter having a cut-off frequency of $fc/2$ to derive only the AM stereo modulation wave.

2 Claims, 5 Drawing Sheets

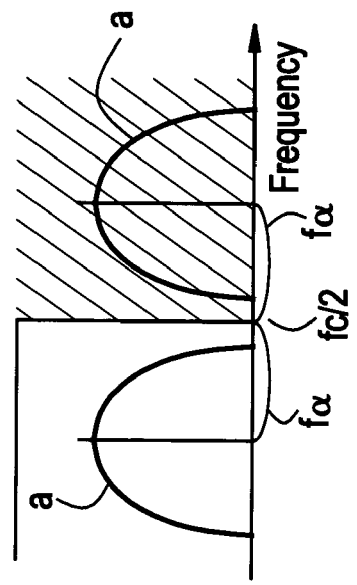 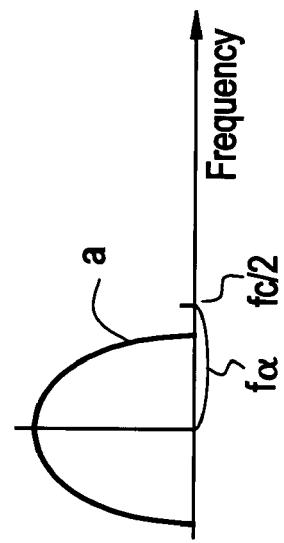
FIG. 2A  FIG. 2B  FIG. 2C  FIG. 2D  FIG. 2E

METHOD FOR REMOVING AM NEIGHBORING INTERFERENCE AND A CIRCUIT FOR THE SAME

BACKGROUND OF THE INVENTION

1. Field of the Invention

The present invention relates to a method of selecting, during an AM broadcast reception, only a desired AM modulation wave on a desired channel by removing another AM modulation wave on a neighboring channel, and to an AM neighboring interference removing circuit executing such a method.

2. Description of the Related Art

An interchannel band width of an AM broadcast is set, for example, to 9 kHz in Japan, and an AM modulation side band width is permitted up to 7.5 kHz. An AM modulation wave from a remote site or an overseas country may superpose, particularly in a midnight, upon a neighboring channel of a desired channel. In such a case, a desired AM modulation wave with a superposed neighboring AM modulation wave is demodulated and a user listens to the demodulated sounds in a radio interference state, or the desired AM modulation wave is demodulated through SSB.

However, it is difficult to listen to demodulated signals in a radio interference state. If demodulation through SSB is used and a desired channel is AM stereo broadcast, a user cannot listen to demodulated signals in a stereo state from the reason of the operation principle.

SUMMARY OF THE INVENTION

It is an object of the present invention to provide an AM neighboring interference removing method capable of selecting only a desired AM modulation wave even if an interfering AM modulation wave partially superposes upon the desired wave, and an AM neighboring interference removing circuit.

According to one aspect of the present invention, A method of removing AM neighboring interference of an AM receiver, is provided which comprises the steps of: multiplying an AM modulation wave desired to be received by a signal having a frequency higher by a predetermined frequency than a carrier frequency of an interference AM modulation wave causing neighboring interference and by another frequency lower by the predetermined frequency than the carrier frequency of the interference AM modulation wave; removing high frequency components from each of two multiplied signals to derive two signals, and subtracting one of the two derived signals from the other to obtain a subtraction signal; and removing high frequency components higher than a predetermined frequency from the subtraction signal to obtain the AM modulation wave desired to be received.

With this AM neighboring interference removing method, first an AM modulation wave desired to be received is multiplied by a signal having a frequency higher by a predetermined frequency than a carrier frequency of an interference AM modulation wave causing neighboring interference and by another frequency lower by the predetermined frequency than the carrier frequency of the interference AM modulation wave, to obtain two multiplied signals. Next, high frequency components are removed from each of the two multiplied signals. One of the two multiplied signals with the high frequency components being removed is subtracted from the other to obtain a subtraction signal. Lastly, high frequency components higher than a predetermined frequency are removed from the subtraction signal to obtain the AM modulation wave desired to be received.

According to another aspect of the invention, an AM neighboring interference removing circuit for removing AM neighboring interference of an AM receiver, is provided which comprises: a first local oscillator for generating an oscillation output having a frequency of fp1; a second local oscillator for generating an oscillation output having a frequency of fp2; a first multiplier for multiplying an AM stereo modulation wave desired to be received, by the oscillation output from the first local oscillator; a second multiplier for multiplying the AM stereo modulation wave desired to be received, by the oscillation output from the second local oscillator; a first low-pass filter for removing high frequency components contained in an output of the first multiplier; a second low-pass filter for removing high frequency components contained in an output of the second multiplier; a subtractor for subtracting an output of the second low-pass filter from an output of the first low-pass filter; and a low-pass filter for receiving an output of the subtractor and having a cut-off frequency of fc/2, wherein fc is a carrier frequency of an interference AM modulation wave causing neighboring interference, fp1>fp2, and fp1−fc=fc−fp2.

With this AM neighboring interference removing circuit, the AM stereo modulation wave and the interference modulation wave are frequency-converted by the first and second multipliers, and their low-frequency components are output from the first and second low-pass filters. It is assumed that a difference frequency is fα between an AM carrier frequency of the AM stereo modulation wave desired to be received and a carrier frequency of an interference AM modulation wave. Of an output from the first low-pass filter, the carrier frequency of the interference wave is fc/2 and the carrier frequency of the AM stereo modulation wave desired to be received is (fc/2−fα), and of an output from the second low-pass filter, the carrier frequency of the interference wave is fc/2 and the carrier frequency of the AM stereo modulation wave desired to be received is (fc/2+fα). The subtractor cancels out the interference wave, and the third low-pass filter selects only the AM stereo modulation wave desired to be received. In this manner, the interference wave can be removed.

According to another aspect of the invention, an AM neighboring interference removing circuit for removing AM neighboring interference of an AM receiver, is provided which comprises: a first local oscillator for generating an oscillation output having a frequency of (fp1+fα); a second local oscillator for generating an oscillation output having a frequency of (fp2−fα); a third local oscillator for generating an oscillation output having a frequency of (fp2+3fα); a first multiplier for multiplying an AM stereo modulation wave desired to be received, by the oscillation output from the first local oscillator; a second multiplier for multiplying the AM stereo modulation wave desired to be received, by the oscillation output from the second local oscillator; a third multiplier for multiplying the AM stereo modulation wave desired to be received, by the oscillation output from the third local oscillator; a first low-pass filter for removing high frequency components contained in an output of the first multiplier; a second low-pass filter for removing high frequency components contained in an output of the second multiplier; a third low-pass filter for removing high frequency components contained in an output of the third multiplier; a subtractor for subtracting outputs of the second and third low-pass filters from an output of the first low-pass filter; and a band-pass filter for receiving an output of the subtractor and having a band-pass frequency in a range from (fc/2−fα) to (fc/2+fα), wherein fc and (fc+2fα) are carrier frequencies of interference AM modulation waves causing neighboring interference, being lower and higher by a frequency fα from an AM carrier frequency of the AM stereo modulation wave desired to be received, fp1>fp2, and fp1−fc=fc−fp2.

With this AM neighboring interference removing circuit, the AM stereo modulation wave and the interference modulation wave are frequency-converted by the first, second, and third multipliers, and their low-frequency components are output from the first, second, and third low-pass filters. It is assumed that a difference frequency is fα between an AM carrier frequency of the AM stereo modulation wave desired to be received and a carrier frequency of an interference AM modulation wave. Of an output from the first low-pass filter, the carrier frequency of the AM stereo modulation wave desired to be received is fc/2 and the carrier frequencies of the neighboring interference waves are at positions higher and lower by the frequency fα from the frequency fc/2. Of an output from the second low-pass filter, the carrier frequency of the AM stereo modulation wave desired to be received is (fc/2−2fα) and the carrier frequencies of the neighboring interference waves are at positions higher and lower by the frequency fα from the frequency (fc/2−2fα). Of an output from the third low-pass filter, the carrier frequency of the AM stereo modulation wave desired to be received is (fc/2+2fα) and the carrier frequencies of the neighboring interference waves are at positions higher and lower by the frequency fα from the frequency (fc/2+2fα). The subtractor cancels out the interference wave output from the first low-pass filter, and the band-pass filter selects only the AM stereo modulation wave desired to be received, from the first-low pass filter. In this manner, the interference waves can be removed.

BRIEF DESCRIPTION OF THE DRAWINGS

FIGS. 2A to 2E are diagrams illustrating the operation of the AM neighboring interference removing circuit of the embodiment shown in FIG. 1.

DETAILED DESCRIPTION OF THE PREFERRED EMBODIMENTS

Embodiments of a method and circuit for removing AM neighboring interference will be described.

Figure 1:
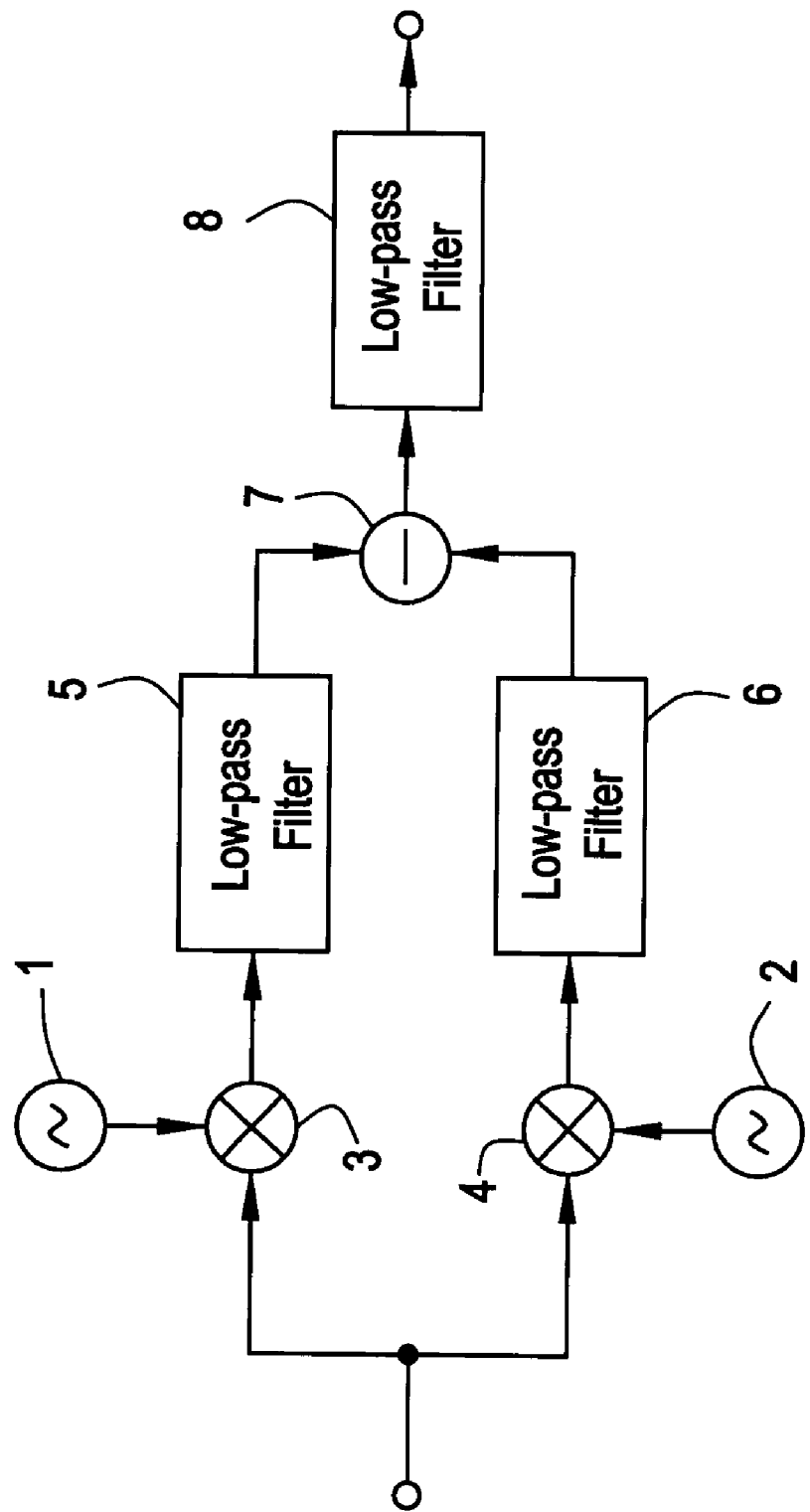
FIG. 1 is a block diagram showing the structure of an AM neighboring interference removing circuit according to an embodiment of the invention.

FIG. 1 is a block diagram showing the structure of an AM neighboring interference removing circuit according to an embodiment of the invention.

An AM stereo modulation wave received at an AM receiver is supplied to a multiplier 3 whereat it is multiplied by an output from a local oscillator 1 having an oscillation frequency of (3/2)ωct. The received AM stereo modulation wave is also supplied to a multiplier 4 whereat it is multiplied by an output from a local oscillator 2 having an oscillation frequency of (1/2)ωct. An output of the multiplier 3 is supplied to a low-pass filter 5 whereat the high frequency components of the multiplier output are removed. An output of the multiplier 4 is supplied to a low-pass filter 6 whereat the high frequency components of the multiplier output are removed.

The outputs from the low-pass filters 5 and 6 are supplied to a subtractor 7 whereat the output from the low-pass filter 5 is subtracted by the output from the low-pass filter 6. An output of the subtractor 7 is supplied to a low-pass filter 8 having a cut-off frequency of fc/2(=ωc/4π) whereat the high frequency components of the subtractor output are removed, and the signal with the removed high frequency components is output from the low-pass filter 8.

The operation of the AM neighboring interference removing circuit of the embodiment constructed as above will be described.

An AM stereo modulation wave desired to be received and mixed with a neighboring interference wave is written by the following equation (1).

$$v(t) = (1 + M0)\cos\{(\omega c + \omega\alpha)t + \theta\} + \quad (1)$$
$$(1 + M1)\cos(\omega ct) \text{ where}$$
$$M0 = 1 + \kappa 0 \cdot vm0(t),$$
$$M1 = 1 + \kappa 1 \cdot vm1(t), \text{ and}$$
$$\theta = \arctan[\kappa 0 \cdot vs0(t)/\{1 + \kappa 0 \cdot vm0(t)\}].$$

In the equation (1), the first term is the AM stereo modulation wave desired to be received, and the second term is the neighboring AM interference wave. The affix 0 is used for the AM stereo modulation wave desired to be received, and the affix 1 is used for the neighboring AM interference wave. κ0 is an AM modulation factor of the AM stereo modulation wave desired to be received, κ1 is an AM modulation factor of the neighboring AM interference wave, vm0(t) is a mono modulation wave of the AM stereo modulation wave desired to be received, vs0(t) is a stereo modulation wave of the AM modulation wave, vm1(t) is a modulation wave of the neighboring AM interference wave, ωc is an angular frequency (rad/s) of a neighboring AM interference carrier wave, and ωα is a difference angular frequency (rad/s) between the neighboring AM interference carrier wave and an AM modulation carrier wave desired to be received.

The AM stereo modulation wave desired to be received and mixed with the neighboring interference wave which is given by the equation (1) is schematically shown in FIG. 2A. A reference character "a" in FIG. 2A represents the AM stereo modulation wave desired to be received, and a reference character "b" represents the neighboring AM interference wave.

The AM stereo modulation wave desired to be received and mixed with the neighboring interference wave is multiplied at the multiplier 3 by the output cos(3/2)ωct of the local oscillator 1, and the high frequency components are removed by the low-pass filter 5. An input to the low-pass filter 5 is v(t)·cos(3/2)ωct, and an output thereof is written by the following equation (2).

An output of the low-pass filter 5

$$= (1 + M0)\cos\{(-\omega c/2 + \omega\alpha)t + \theta\} + \qquad (2)$$
$$(1 + M1)\cos(-1/2)\omega ct$$
$$= (1 + M0)\cos\{(\omega c/2 - \omega\alpha)t - \theta\} +$$
$$(1 + M1)\cos(1/2)\omega ct$$

The AM stereo modulation wave desired to be received and mixed with the neighboring interference wave is also multiplied at the multiplier 4 by the output cos(1/2)ωct of the local oscillator 2, and the high frequency components are removed by the low-pass filter 6. An input to the low-pass filter 6 is v(t)·cos(1/2)ωct, and an output thereof is written by the following equation (3).

An output of the low-pass filter 6=(1+M0)cos{(ωc/2+ωα)t+θ}+(1+M1)cos(1/2)ωct  (3)

The output of the low-pass filter 5 given by the equation (2) is schematically shown in FIG. 2B, and the output of the low-pass filter 6 given by the equation (3) is schematically shown in FIG. 2C. The subtractor 7 subtracts the output of the low-pass filter 6 given by the equation (3) from the output of the low-pass filter 5 given by the equation (2). An input to the subtractor 7 is a signal of v(t)·cos(3/2)ωct−v(t)·cos(1/2)ωct−high frequency components, and an output of the subtractor 7 is given by the following equation (4).

An output of the subtractor 7=(1+M0)cos{(ωc/2−ωα)t−θ}+(1+M1)cos{(ωc/2+ωα)t+θ}  (4)

The output of the subtractor 7 is schematically shown in FIG. 2D. The low-pass filter 8 removes from the output of the subtractor 7 the second term of the equation (4) (indicated by oblique lines in FIG. 2D), and outputs a signal written by the following equation (5).

(1+M0)cos{(ωc/2−ωα)t−θ}  (5)

As seen from the equation (5), the output of the low-pass filter 8 is that shown in FIG. 2E which is the AM stereo modulation wave desired to be received. It can be understood that the AM neighboring interference removing circuit of the embodiment can remove the neighboring interference wave and receive only the AM stereo modulation wave desired to be received.

In the AM neighboring interference removing circuit of this embodiment, the angular frequency of the local oscillator 1 is set to (3/2)ωc and the angular frequency of the local oscillator 2 is set to (1/2)ωc. The angular frequencies of the local oscillators 1 and 2 may be set to different frequencies so long as they satisfy the relation of (ωpf1)−ωc=ωc−(ωpf2), where (ωpf1)>(ωpf2), (ωpf1) stands for the angular frequency (3/2)ωc, and (ωpf2) stands for the angular frequency (1/2)ωc.

A first modification of the AM neighboring interference removing circuit according to the embodiment of the invention will be described.

Figure 3:
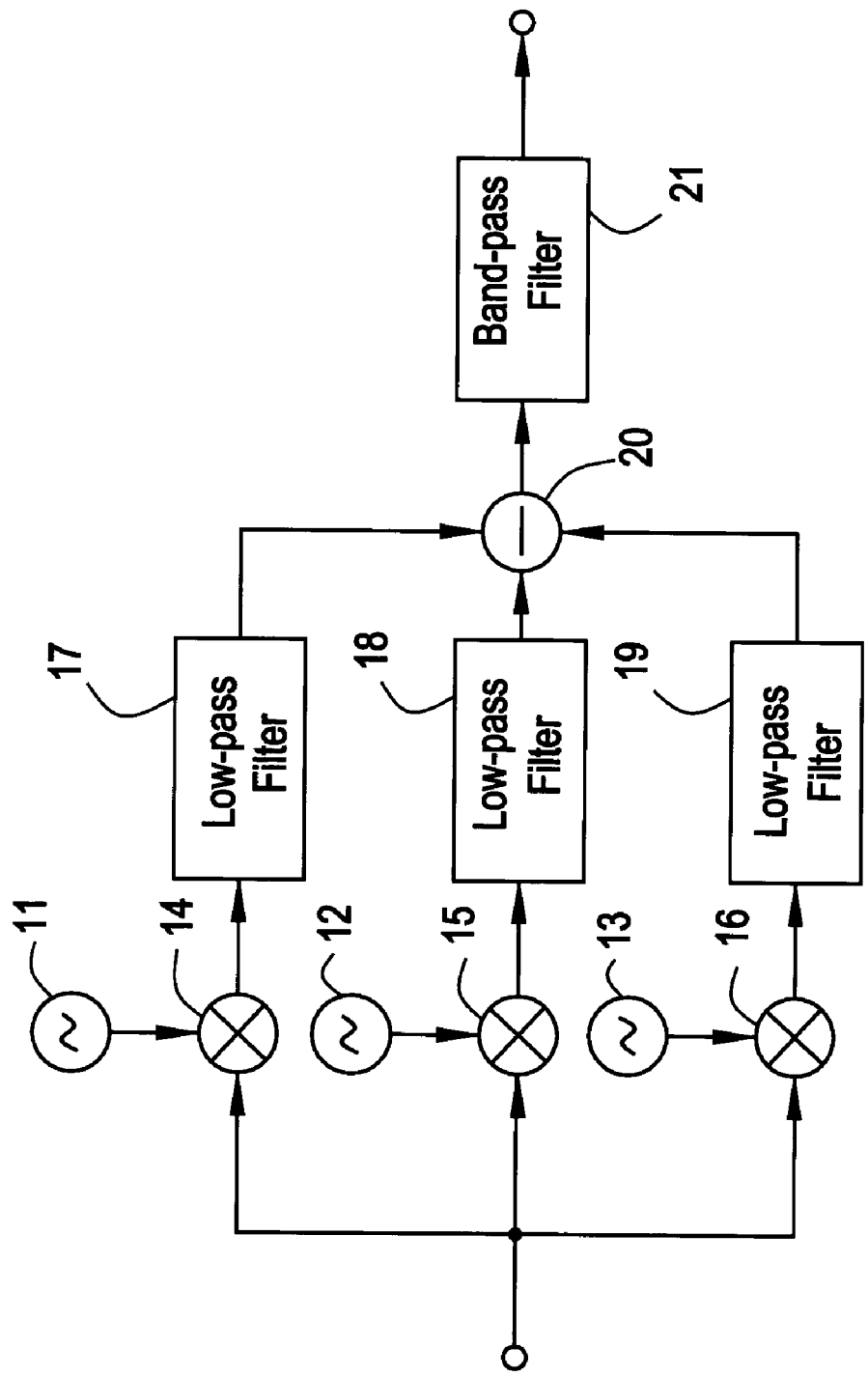
FIG. 3 is a block diagram showing the structure of an AM neighboring interference removing circuit according to a first modification of the embodiment.

FIG. 3 is a block diagram showing the structure of the first modification of the AM neighboring interference removing circuit according to the embodiment of the invention.

Figure 4A:
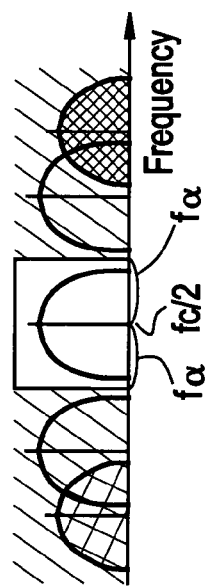
FIGS. 4A to 4F are diagrams illustrating the operation of the AM neighboring interference removing circuit of the first modification.

In the first modification of the AM neighboring interference removing circuit according to the embodiment of the invention, two neighboring interference waves such as shown in FIG. 4A are removed respectively having frequencies higher and lower by ωα than the frequency of the AM stereo modulation wave desired to be received.

In the first modification of the AM neighboring interference removing circuit according to the embodiment of the invention, an AM stereo modulation wave desired to be received and mixed with neighboring interference waves is written by the following equation (6).

$$v(t) = (1 + M1)\cos(\omega ct) + \qquad (6)$$
$$(1 + M0)\cos\{(\omega c + \omega\alpha)t + \theta\} +$$
$$(1 + M2)\cos(\omega c + 2\omega\alpha)t \text{ where}$$
$$M0 = 1 + \kappa 0 \cdot vm0(t),$$
$$M1 = 1 + \kappa 1 \cdot vm1(t),$$
$$M2 = 1 + \kappa 2 \cdot vm2(t), \text{ and}$$
$$\theta = \arctan[\kappa 0 \cdot vs0(t)/\{1 + \kappa 0 \cdot vm0(t)\}].$$

In the equation (6), the first term is the neighboring interference wave having a lower frequency, the second term is the AM stereo modulation wave desired to be received, and the third term is the neighboring AM interference wave having a higher frequency. The affix 0 is used for the AM stereo modulation wave desired to be received, and the affixes 1 and 2 are used for the neighboring AM interference wave. κ0 is an AM modulation factor of the AM stereo modulation wave desired to be received, κ1 and κ2 are AM modulation factors of the neighboring AM interference waves, vm0(t) is a mono modulation wave of the AM stereo modulation wave desired to be received, vm1(t) and vm2(t) are modulation waves of the neighboring AM interference waves, vs0(t) is a stereo modulation wave of the AM modulation wave, ωc+ωα is an angular frequency (rad/s) of the AM stereo modulation carrier wave desired to be received, (ωc) and (ωc+2ωα) are angular frequencies (rad/s) of the neighboring AM interference carrier waves, and ωα is a difference angular frequency (rad/s) between each neighboring AM interference carrier wave and an AM modulation carrier wave desired to be received.

The AM stereo modulation wave desired to be received and mixed with the neighboring interference waves which is given by the equation (6) is schematically shown in FIG. 4A. A reference character "a" in FIG. 4A represents the AM stereo modulation wave desired to be received, a reference character "b" represents the neighboring AM interference wave indicated by coarse meshes, and a reference character "c" represents the neighboring AM interference wave indicated by fine meshes.

The AM stereo modulation wave desired to be received and mixed with the neighboring interference waves which is given by the equation (6) is multiplied at a multiplier 14 by an output cos{(3/2)ωc+ωα}t of a local oscillator 11, and the multiplied output is supplied to a low-pass filter 17 whereat the frequency components of the multiplier output are removed. An input to the low-pass filter 17 is v(t)·cos(3/2)ωc+ωα)t, and an output thereof is written by the following equation (7).

An output of the low-pass filter 17

$$= (1 + M1)\cos\{(-1/2)\omega c - \omega\alpha\}t + \qquad (7)$$
$$(1 + M0)\cos\{(-1/2)\omega ct + \theta\} +$$
$$(1 + M2)\cos\{(-1/2)\omega c + \omega\alpha\}t$$
$$= (1 + M1)\cos\{(1/2)\omega c + \omega\alpha\}t +$$
$$(1 + M0)\cos\{(1/2)\omega ct - \theta\} +$$
$$(1 + M2)\cos\{(1/2)\omega c - \omega\alpha\}t$$

The AM stereo modulation wave desired to be received and mixed with the neighboring interference waves which is given by the equation (6) is multiplied at a multiplier 15 by an output $\cos\{(1/2)(\omega c-\omega\alpha)\}t$ of a local oscillator 12, and the multiplied output is supplied to a low-pass filter 18 whereat the frequency components of the multiplier output are removed. An input to the low-pass filter 18 is $v(t)\cdot\cos(1/2)(\omega c-\omega\alpha)t$, and an output thereof is written by the following equation (8).

An output of the low-pass filter $18=(1+M1)\cos\{(1/2)\omega c+\omega\alpha\}t+(1+M0)\cos[\{(1/2)\omega c+2\omega\alpha\}t+\theta]+(1+M2)\cos\{(1/2)\omega c+3\omega\alpha\}t$ (8)

The AM stereo modulation wave desired to be received and mixed with the neighboring interference waves which is given by the equation (6) is multiplied at a multiplier 16 by an output $\cos\{(1/2)\omega c+3\omega\alpha\}t$ of a local oscillator 19, and the multiplied output is supplied to a low-pass filter 19 whereat the frequency components of the multiplier output are removed. An input to the low-pass filter 19 is $v(t)\cdot\cos(1/2)\omega c+3\omega\alpha)t$, and an output thereof is written by the following equation (9).

An output of the low-pass filter $19=(1+M1)\cos\{(1/2)\omega c-3\omega\alpha\}t+(1+M0)\cos\{(1/2)\omega c-2\omega\alpha)t+\theta\}+(1+M2)\cos\{(1/2)\omega c-\omega\alpha\}t$ (9)

Figure 4B:
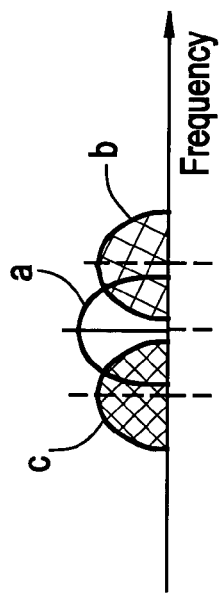
Figure 4C:
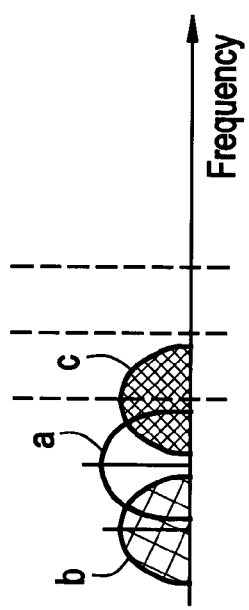
Figure 4D:
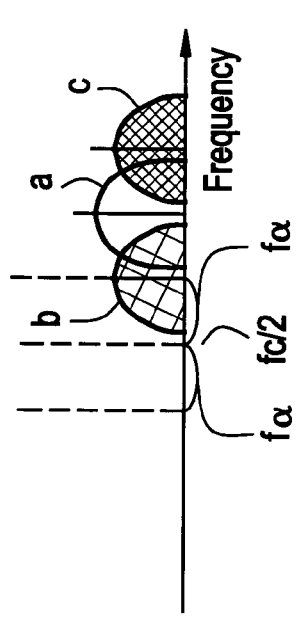

The output of the low-pass filter 17 given by the equation (7) is schematically shown in FIG. 4B, the output of the low-pass filter 18 given by the equation (8) is schematically shown in FIG. 4C, and the output of the low-pass filter 19 given by the equation (9) is schematically shown in FIG. 4D. A subtractor 20 subtracts the outputs of the low-pass filters 18 and 19 given by the equations (8) and (9) from the output of the low-pass filter 17 given by the equation (7). With this subtraction, the first term of the equation (7) and the first term of the equation (8) are cancelled out, and the third term of the equation (7) and the third term of the equation (9) are cancelled out, so that a signal given by the following equation (1) is output from the subtractor 20.

An input to the subtractor $20=v(t)\cdot\cos\{(3/2)\omega c+\omega\alpha\}t-v(t)\cdot\cos\{(1/2)\omega c-\omega\alpha)t-v(t)\cdot\cos\{(1/2)\omega c+3\omega\alpha)t$–high frequency components at each term.

An output of the subtractor $20=(1+M0)\cos\{(1/2)\omega ct-\theta\}+(1+M0)\cos[\{(1/2)\omega c+2\omega\alpha\}t+\theta]+(1+M2)\cos\{1/2)\omega c+3\omega\alpha)t+(1+M1)\cos\{1/2)\omega c-3\omega\alpha)t+(1+M0)\cos[\{(1/2)\omega c-2\omega\alpha\}t+\theta]$ (10)

Figure 4E:
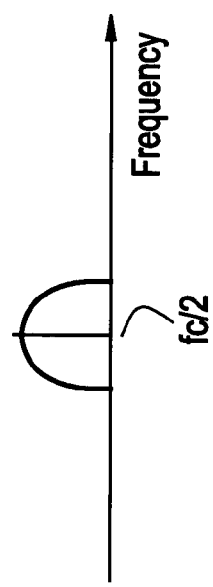

The output of the subtractor 20 given by the equation (10) is schematically shown in FIG. 4E. The subtraction output given by the equation (10) is supplied to a band-pass filter 21 having a band-path width of from $(1/2)fc-f\alpha$ to $(1/2)fc+f\alpha$ to remove the frequency components other than the band-path width. An output of the band-pass filter 21 is given by the following equation (11). A hatched portion in FIG. 4E is a frequency range other than the band-path width of the band-pass filter.

$(1+M0)\cos\{(1/2)\omega ct-\theta\}$ (11)

Figure 4F:
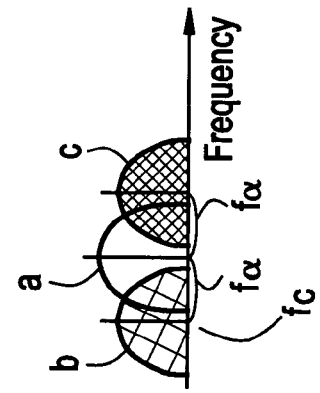

The output of the band-pass filter given by the equation (11) is schematically shown in FIG. 4F. Only the AM stereo modulation wave desired to be received can therefore be selected.

A second modification of the AM neighboring interference removing circuit according to the embodiment of the invention will be described.

Figure 5A:
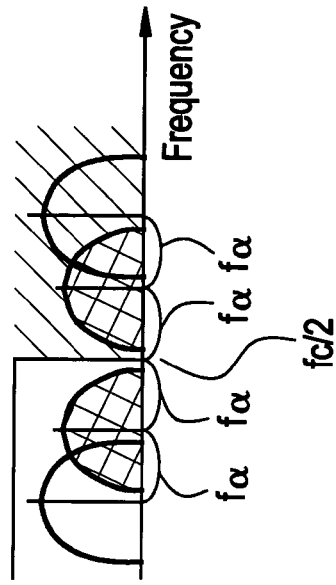
FIGS. 5A to 5E are diagrams illustrating the operation of an AM neighboring interference removing circuit according to a second modification of the embodiments.

In the second modification of the AM neighboring interference removing circuit according to the embodiment of the invention, two neighboring interference waves such as shown in FIG. 5A are removed having frequencies higher respectively by $\omega\alpha$ and $2\omega\alpha$ than the frequency of the AM stereo modulation wave desired to be received.

In the second modification of the AM neighboring interference removing circuit according to the embodiment of the invention, an AM stereo modulation wave desired to be received and mixed with neighboring interference waves is written by the following equation (12).

$$v(t) = (1 + M0)\cos\{(\omega c - 2\omega\alpha)t + \theta\} + \quad (12)$$
$$(1 + M1)\cos(\omega c - \omega\alpha)t +$$
$$(1 + M2)\cos(\omega ct) \text{ where}$$
$$M0 = 1 + \kappa 0 \cdot vm0(t),$$
$$M1 = 1 + \kappa 1 \cdot vm1(t),$$
$$M2 = 1 + \kappa 2 \cdot vm2(t), \text{ and}$$
$$\theta = \arctan[\kappa 0 \cdot vs0(t)/\{1 + \kappa 0 \cdot vm0(t)\}].$$

In the equation (12), the first term is the AM stereo modulation wave desired to be received, the second term is the neighboring interference wave having a lower frequency, and the third term is the neighboring AM interference wave having a higher frequency. The affix 0 is used for the AM stereo modulation wave desired to be received, and the affixes 1 and 2 are used for the neighboring AM interference waves. $\kappa 0$ is an AM modulation factor of the AM stereo modulation wave desired to be received, $\kappa 1$ and $\kappa 2$ are AM modulation factors of the neighboring AM interference waves, $vm0(t)$ is a mono modulation wave of the AM stereo modulation wave desired to be received, $vm1(t)$ and $vm2(t)$ are modulation waves of the neighboring AM interference waves, $vs0(t)$ is a stereo modulation wave of the AM modulation wave, $(\omega c-2\omega\alpha)$ is an angular frequency (rad/s) of the AM stereo modulation carrier wave desired to be received, $(\omega c-\omega\alpha)$ and $(\omega c)$ are angular frequencies (rad/s) of the neighboring AM interference carrier waves, and $\omega\alpha$ and $2\omega\alpha$ are difference angular frequencies (rad/s) between each neighboring AM interference carrier wave and an AM modulation carrier wave desired to be received.

The AM stereo modulation wave desired to be received and mixed with the neighboring interference waves is schematically shown in FIG. 5A. A reference character "a" in FIG. 5A represents the AM stereo modulation wave desired to be received, reference characters "b" and "c" represent the neighboring AM interference waves one of which is indicated by meshes.

The AM stereo modulation wave desired to be received and mixed with the neighboring interference waves which is given by the equation (12) is multiplied by an output $\cos\{(3/2)\omega c+\omega\alpha\}t$ of a local oscillator 11, and the multiplied output is supplied to a first low-pass filter whereat the frequency components of the multiplied output are removed. An input to the first low-pass filter is $v(t)\cdot\cos(3/2)\omega c+\omega\alpha)t$, and an output thereof is written by the following equation (13).

An output of the first low-pass filter $$= (1 + M0)\cos[\{(-1/2)\omega c - 2\omega\alpha\}t + \theta] + \quad (13)$$
$$(1 + M1)\cos\{(-1/2)\omega c - \omega\alpha\}t +$$
$$(1 + M2)\cos(-1/2)\omega ct$$
$$= (1 + M0)\cos[\{(1/2)\omega c + 2\omega\alpha\}t - \theta +$$
$$(1 + M1)\cos\{(1/2)\omega ct + \omega\alpha\}t +$$
$$(1 + M2)\cos(1/2)\omega ct$$

The AM stereo modulation wave desired to be received and mixed with the neighboring interference waves which is given by the equation (12) is multiplied by an output $\cos\{(1/2)\omega ct$ of a local oscillator, and the multiplied output is supplied to a second low-pass filter whereat the frequency components of the multiplied output are removed. An input to the second low-pass filter is $v(t)\cdot\cos(1/2)\omega ct$, and an output thereof is written by the following equation (14).

An output of the second low-pass filter=$(1+M0)\cos[\{(1/2)\omega c-2\omega\alpha\}t+\theta]+(1+M1)\cos\{(1/2)\omega c-\omega\alpha\}t+(1+M2)\cos\{(1/2)\omega ct$ (14)

Figure 5B:
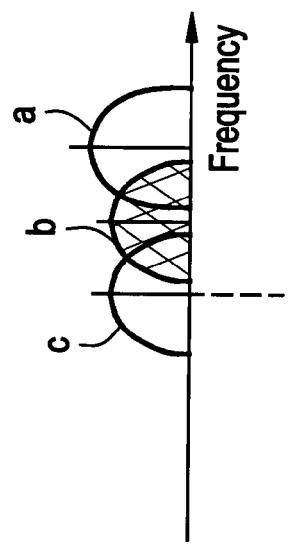
Figure 5C:
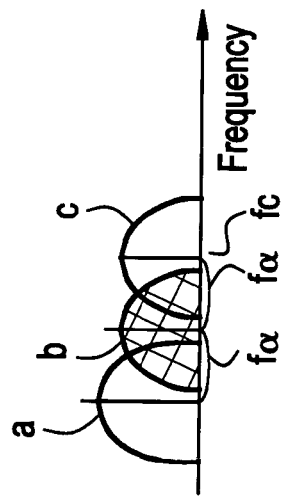

The output of the first low-pass filter given by the equation (13) is schematically shown in FIG. 5B, and the output of the second low-pass filter given by the equation (14) is schematically shown in FIG. 5C. A first subtractor subtracts the output of the second low-pass filter given by the equation (14) from the output of the first low-pass filter given by the equation (13). With this subtraction, the third term of the equation (13) and the third term of the equation (14) are cancelled out, so that a signal given by the following equation (15) is output from the first subtractor.

An input to the first subtractor=$v(t)\cdot\cos(3/2)\omega ct - v(t)\cdot\cos(1/2)\omega ct$-high frequency components An output of the first subtractor=$(1+M0)\cos[\{(1/2)\omega c-\omega\alpha\}t-\theta]+(1+M1)\cos\{(1/2)\omega c+\omega\alpha\}t-(1+M0)\cos[\{(1/2)\omega c-2\omega\alpha\}t+\theta]-(1+M1)\cos\{1/2)\omega c-\omega\alpha\}t$ (15)

Figure 5D:
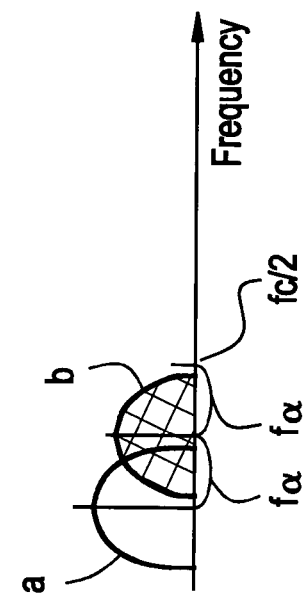

The output of the first subtractor given by the equation (15) is schematically shown in FIG. 5D. The subtraction output given by the equation (15) is supplied to a third low-pass filter having a cut-off frequency of $(1/2)fc$ to remove the high frequency components. An output of the third low-pass filter is given by the following equation (16). A hatched portion in FIG. 4D is a high frequency range to be cut off by the third low-pass filter.

An output of the third low-pass filter=$-(1+M0)\cos[\{(1/2)\omega c-2\omega\alpha\}t+\theta]-(1+M1)\cos\{(1/2)\omega c-\omega\alpha\}t$ (16)

Figure 5E:
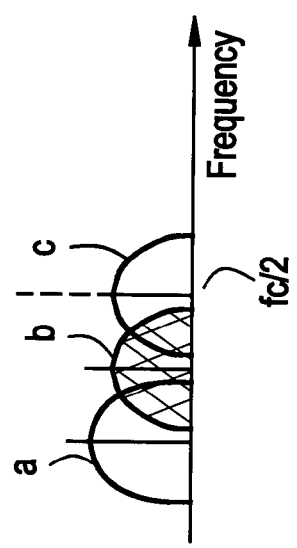

The output of the third low-pass filter given by the equation (16) is schematically shown in FIG. 5E. One of the neighboring interference waves can therefore be removed. The AM stereo modulation wave desired to be received and mixed with the other of the neighboring interference waves is supplied to the AM neighboring interference removing circuit of the embodiment of the invention to thereby remove the remaining neighboring interface wave with similar operations to the embodiment. Only the AM stereo modulation wave desired to be received can therefore be selected.

Even if a number of neighboring interference waves are superposed, all the waves can be removed by using a combination of the embodiment and the first and second modifications of the AM neighboring interference removing circuit of the invention.

As described so far, according to the embodiment method and circuit of removing AM interference, even an AM stereo modulation wave can be listened by a user as clear sounds without any neighboring interference waves which are conventionally listened as noises.

What is claimed is:

1. An AM neighboring interference removing circuit for removing AM neighboring interference of an AM receiver, comprising:

a first local oscillator for generating an oscillation output having a frequency of fp1;

a second local oscillator for generating an oscillation output having a frequency of fp2;

a first multiplier for multiplying an AM stereo modulation wave desired to be received, by the oscillation output from said first local oscillator;

a second multiplier for multiplying the AM stereo modulation wave desired to be received, by the oscillation output from said second local oscillator;

a first low-pass filter for removing high frequency components contained in an output of said first multiplier;

a second low-pass filter for removing high frequency components contained in an output of said second multiplier;

a subtractor for substracting an output of said second low-pass filter from an output of said first low-pass filter; and a low-pass filter for receiving an output of said subtractor and having a cut-off frequency of fc/2, wherein fc is a carrier frequency of an interference AM modulation wave causing neighboring interference, fp1>fp2, and fp1 fc=fc−fp2.

2. An AM neighboring interference removing circuit for removing AM neighboring interference of an AM receiver, comprising:

a first local oscillator for generating an oscillation output having a frequency of (fp1+fα);

a second local oscillator for generating an oscillation output having a frequency of (fp2−fα);

a third local oscillator for generating an oscillation output having a frequency of (fp2+3fα);

a first multiplier for multiplying an AM stereo modulation wave desired to be received, by the oscillation output from said first local oscillator;

a second multiplier for multiplying the AM stereo modulation wave desired to be received, by the oscillation output from said second local oscillator;

a third multiplier for multiplying the AM stereo modulation wave desired to be received, by the oscillation output from said third local oscillator;

a first low-pass filter for removing high frequency components contained in an output of said first multiplier;

a second low-pass filter for removing high frequency components contained in an output of said second multiplier;

a third low-pass filter for removing high frequency components contained in an output of said third multiplier;

a subtractor for subtracting outputs of said second and third low-pass filters from an output of said first low-pass filter; and a band-pass filter for receiving an output of said subtractor and having a band-pass frequency in a range form (fc/2fα) to (fc/2+fα), wherein fc and (fc+2fα) are carrier frequencies of interference AM modulation waves causing neighboring interference, being lower and higher by a frequency fα from an AM carrier frequency of the AM stereo modulation wave desired to be received, fp1>fp2, and fp1 fc=fc−fp2.

* * * * *